US011396118B2

(12) United States Patent
Sredzinski et al.

(10) Patent No.: US 11,396,118 B2
(45) Date of Patent: Jul. 26, 2022

(54) ACTUATOR FOR CONTROLLING MULTIPLE INJECTION MOLDING VALVE PINS

(71) Applicant: Incoe Corporation, Auburn Hills, MI (US)

(72) Inventors: Ryan Sredzinski, Royal Oak, MI (US); Scott Greb, Washington Township, MI (US); Anton Jorg, Grossostheim (DE)

(73) Assignee: Incoe Corporation, Auburn Hills, MI (US)

( * ) Notice: Subject to any disclaimer, the term of this patent is extended or adjusted under 35 U.S.C. 154(b) by 371 days.

(21) Appl. No.: 16/579,093

(22) Filed: Sep. 23, 2019

(65) Prior Publication Data

US 2021/0086419 A1 Mar. 25, 2021

(51) Int. Cl.
B29C 45/28 (2006.01)

(52) U.S. Cl.
CPC ...... B29C 45/2803 (2013.01); B29C 45/2806 (2013.01)

(58) Field of Classification Search
CPC ................ B29C 2045/2813; B29C 2045/2827
See application file for complete search history.

(56) References Cited

U.S. PATENT DOCUMENTS

| 5,078,589 A | 1/1992 | Osuna-Diaz |
| 5,894,025 A * | 4/1999 | Lee ....................... B29C 45/281 |
| | | 425/562 |
| 6,343,921 B1 | 2/2002 | Kazmer et al. |
| 7,766,646 B2 | 8/2010 | Feick et al. |
| 7,931,455 B2 | 4/2011 | Tabassi |
| 8,091,202 B2 | 1/2012 | Galati et al. |
| 2007/0290406 A1 | 12/2007 | Kaushal et al. |
| 2009/0100962 A1 | 4/2009 | Uracz et al. |
| 2010/0124579 A1 | 5/2010 | Tabassi et al. |
| 2011/0086121 A1 | 4/2011 | Bouti et al. |
| 2011/0304075 A1 * | 12/2011 | Catoen .................... B29C 45/84 |
| | | 425/562 |
| 2017/0190088 A1 * | 7/2017 | Hall ...................... C07D 413/04 |

FOREIGN PATENT DOCUMENTS

| JP | 2005-153333 A | 6/2005 |
| JP | 2010-221639 A | 7/2010 |
| WO | WO 2009/120534 | 10/2009 |
| WO | WO 2010/015074 | 2/2010 |

OTHER PUBLICATIONS

International Search Report & Written Opinion dated Dec. 23, 2020 (11 pages).

* cited by examiner

*Primary Examiner* — Armand Melendez
(74) *Attorney, Agent, or Firm* — Gunther J. Evanina; Butzel Long, PC (57) ABSTRACT

A valve gate assembly having an actuator assembly configured to simultaneously control a plurality of valve pins to regulate flow of a liquid resin to a mold cavity of an injection molding apparatus is configured to allow fast and easy removal of the actuator assembly from the pins simultaneously by providing a valve plate having a plurality of slots or pockets for receiving and releasably holding a corresponding one of the pins.

10 Claims, 9 Drawing Sheets

ACTUATOR FOR CONTROLLING MULTIPLE INJECTION MOLDING VALVE PINS

FIELD OF THE DISCLOSURE

This disclosure relates to injection molding apparatuses and more particularly to valve gate assemblies having actuators that simultaneously control flow of liquid resin through two or more injection nozzles.

BACKGROUND OF THE DISCLOSURE

Injection molding apparatus having actuators that control flow of liquid resin through two or more injection nozzles reduce the number of actuators needed to control flow of resin into multiple cavities defined in a mold or into multiple mold inlets to a single cavity, thus allowing closer nozzle centers while reducing both capital and operating expenses. Fastening means are provided to connect each valve pin to a valve pin carrier that is coupled to a cylinder rod of the actuator. Maintenance has required disassembly of each of the individual connections between the valve pin carrier and the valve pins, which are usually seized or frozen in place by solidified resin. Conventional disassembly involves prolonged service and maintenance time, and reduced production time. It is an object of this disclosure to provide a valve gate assembly that reduces service and maintenance time and increases production time.

SUMMARY OF THE INVENTION

This disclosure is directed to a valve gate assembly and actuator assembly that provides a quick disconnect and quick assembly arrangement that allows rapid and easy removal of an actuator assembly from multiple valve pins, and rapid and easy assembly of the actuator assembly onto multiple valve pins, thereby reducing the time needed to service the valve gate assembly or molding apparatus to which it is associated and increasing available production time.

The valve gate assembly includes a manifold defining multiple channels for delivering resin to multiple injection nozzles, a plurality of nozzles associated with a corresponding cavity or multiple cavities, a plurality of valve pins that move linearly within an axial bore in an associated nozzle to control flow of resin through the gate of the nozzle, one or several actuators having a linearly movable rod, a valve pin plate that is coupled to the rod and includes a valve pin coupler associated with each of the plurality of valve pins.

In certain embodiments, the valve pin coupler includes a valve pin head receiving section and a valve pin head retaining section. The valve pin head retaining sections hold the pins such that the pins move with liner movement of the valve pin plate and the rod of the actuator, and the valve pin receiving section allows insertion and extraction of the valve pin head. The plurality of valve pin couplers are oriented with respect to one another such that linear movement of the plate with respect to the valve pins causes all pins to move simultaneously between the associated retaining sections and receiving sections. A lock, such as a set screw, can hold the valve pin plate relative to the valve pins and actuator.

DETAILED DESCRIPTION

A hot runner assembly 10 (shown in cross-section in FIG. 1) for an injection molding apparatus includes a heatable manifold 12 having a plurality of passageways that define a hot runner system that facilitates flow of a liquid resin (typically a thermoplastic polymeric composition) from an inlet channel 16 defined in sprue busing 17 to a plurality of nozzles 20. The illustrated gate assembly includes a two-piece manifold 12, including an upper manifold section 12A and a lower manifold section 12B. Locator pins 13 can be employed to ensure proper alignment of section 12A with section 12B. Manifold 12 is an example of a two-section manifold. However, the novel concepts of this disclosure can be used with manifolds having a single section or any number of sections.

Each nozzle 20 has a cylindrical shape and includes a cylindrical bore 26 extending along the cylindrical (or longitudinal) axis of the nozzle. An end of the cylindrical bore defines a gate 27. Centered within the cylindrical bore 26 and extending from an actuator assembly 30 mounted on manifold 12 and generally through the cylindrical bore is a valve pin 28. Valve pin 28 also has a generally cylindrical shape (circular transverse cross-section), with a diameter that is less than the diameter of the cylindrical bore 26, and is generally centered within the bore 26 to define an annular volume 32 between the wall of bore 26 and the outer surfaces of valve pin 28. Valve pin 28 is linearly movable along the longitudinal axis of nozzle 20 between a first position (shown on the left side of FIG. 1) in which a lower end of the valve pin is seated in gate 27 to prevent flow from the nozzle into a mold cavity 34 defined by mold plate 36, and a second position (shown on the right side of FIG. 1) in which the lower end of valve pin 28 is spaced away from the gate. Upper end 38 of nozzle 20 can be provided with external threads that engage internal threads of a nozzle receiving bore of manifold 12 to facilitate disassembly of assembly 10 for maintenance.

Figure 1:
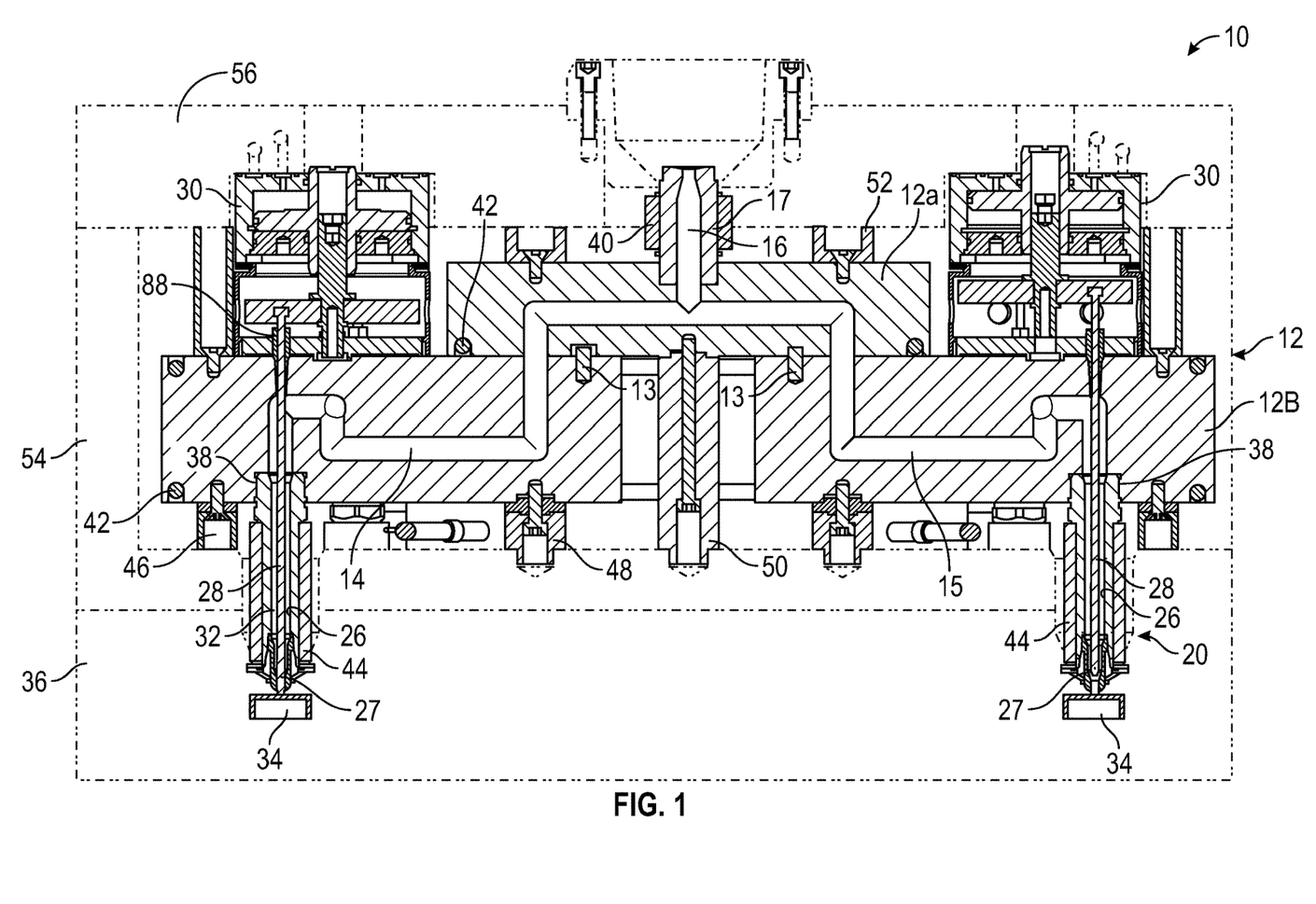
FIG. 1 is a cross-sectional view of an injection molding apparatus incorporating the valve gate assembly and actuator assembly of this disclosure.

The illustrated assembly 10 employs hot runner technology in which the channels and other conduits used for conveying liquid resin from an injection molding machine to cavities 34 are continuously maintained at an elevated temperature during normal operation by sprue heater 40, manifold heater 42 and nozzle heater 44. Heaters 40, 42 and 44 can be electrical resistance heaters.

Assembly 10 includes various support/alignment structures 46, 48, 50, 52 to facilitate proper and stable alignment and spacing of the assembly 10 with intermediate plate 54 and top plate 56.

Figure 2:
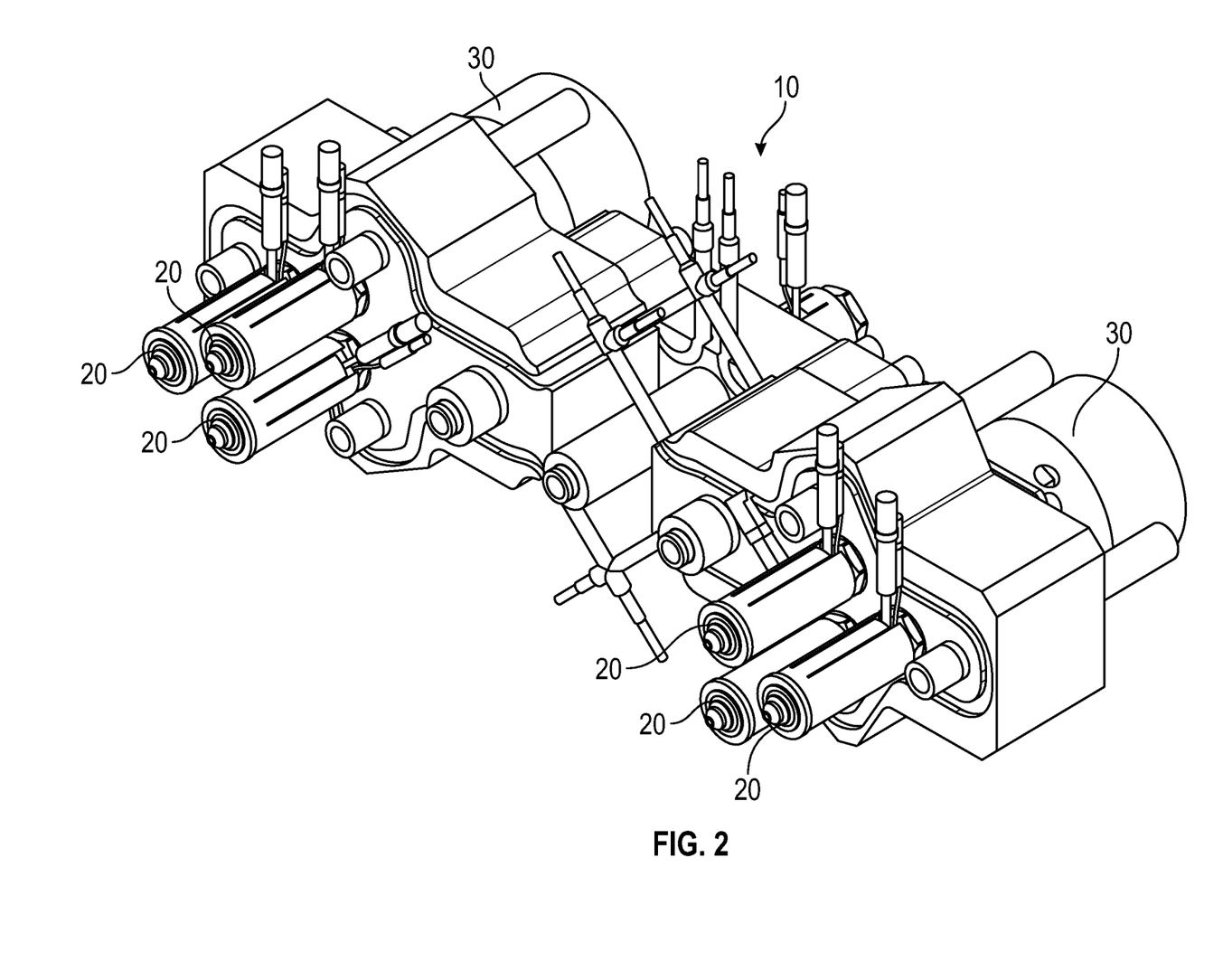
FIG. 2 is a perspective view of the valve gate assembly shown in FIG. 1.

As can be seen by reference to FIG. 2, assembly 10 includes a plurality of nozzles 20 associated with each of actuator assemblies 30. In the illustrated embodiment, flow of resin through three nozzles is regulated by each of two actuator assemblies 30. However, this example is illustrative, and any number of nozzles can be associated with a single actuator assembly (e.g., 2, 3 or 4 nozzles can be controlled by a single actuator assembly).

Figure 3:
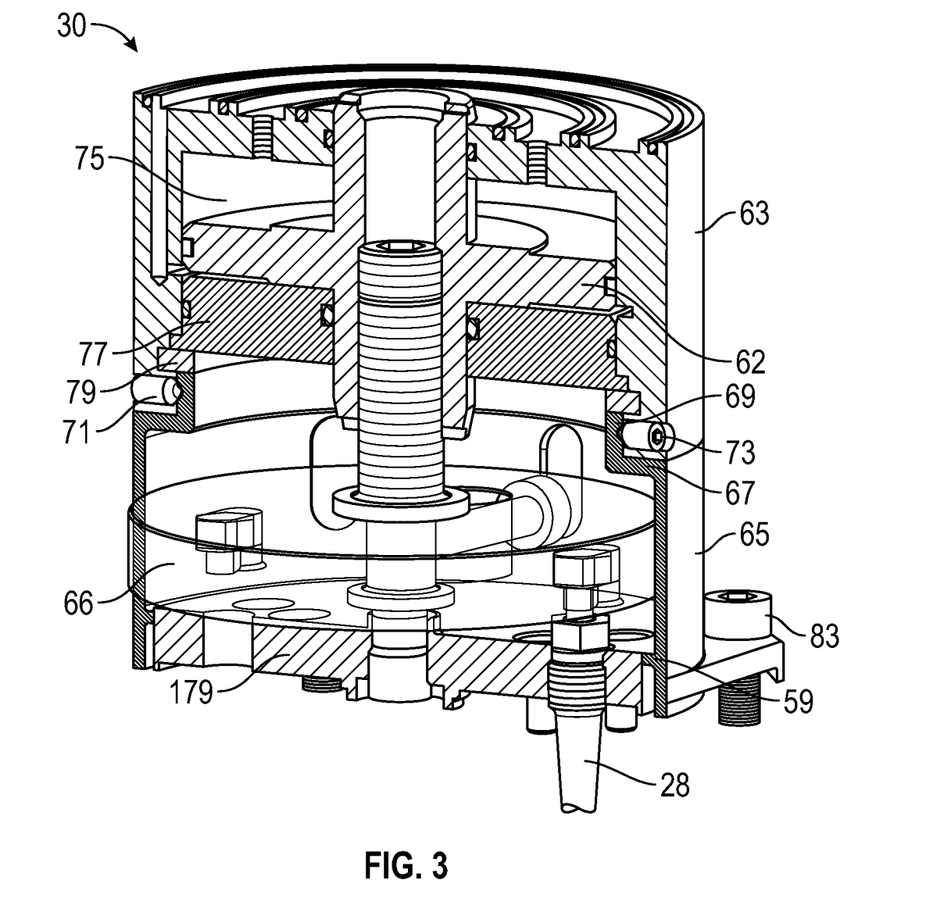
FIG. 3 is a perspective view of the actuator assembly shown in FIGS. 1 and 2, with portions broken away to show interior details.

An actuator assembly 30 and valve pins associated with nozzles 20 are shown in FIG. 3. Assembly 30 includes a cylinder actuator 60 (e.g., hydraulic, electric or pneumatic actuator) which can, for example, be a single acting actuator in which the working fluid acts on only one side of the piston 62 and a mechanical load, such as a spring or compressed air, acts on the other side to effect controlled linear movement of a drive rod 64 attached to piston 62. Alternatively, a double acting actuator may be used in which the working fluid acts on both sides of the piston to control linear movement of valve pin plate 66 and rod 64.

As shown in FIG. 3, actuator assembly 30 includes a piston housing 63 in which piston 62 is housed. Housing 63 is supported by a valve pin plate housing 65 in which valve pin plate 66 is disposed. A circumferential ledge or shoulder 67 extends radially inwardly from the upper edge of valve pin plate housing 65 with a vertical circumferential wall or collar 69 extending upwardly from a radially inward edge of shoulder 67. Piston housing 63 is releasably supported on valve pin plate housing 65 with the lower edge of housing 63 supported on shoulder 67 and the lower end of the radially inwardly facing surface of housing 63 abutting the radially outwardly facing surface of collar 69. Housing 63 is releasably secured to housing 65 by a plurality of screws 71 having a narrow or pointed end extending into a circumferential groove 11 on the outwardly facing surface of collar 69. Screws 71 extend through openings 73 of piston housing 63.

Piston 62 is retained and reciprocates within a chamber 75 defined by housing 63 and cap 77, which is secured to housing 63 by snap ring 79. A pin seal retaining disc 90 is retained on the manifold 12 with bolts. Housing 65 is secured to the manifold by bolts 83. The pin seal retaining disc 90, along with pin seals 88 and valve pin 28 also provide a seal against flow of molten resin upwardly from the manifold.

Figure 4:
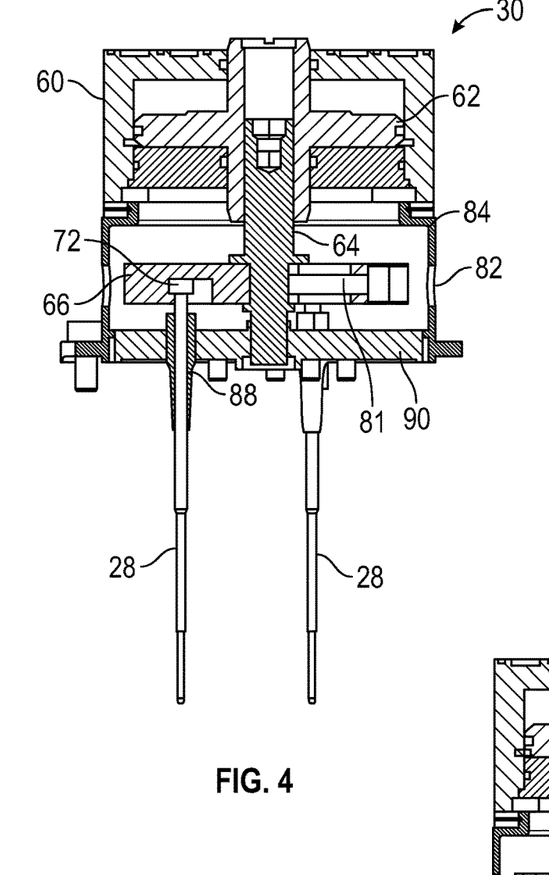
FIGS. 4-7 are cross-sectional views of the actuator assembly of FIG. 3 at various stages during disassembly thereof.
Figure 8:
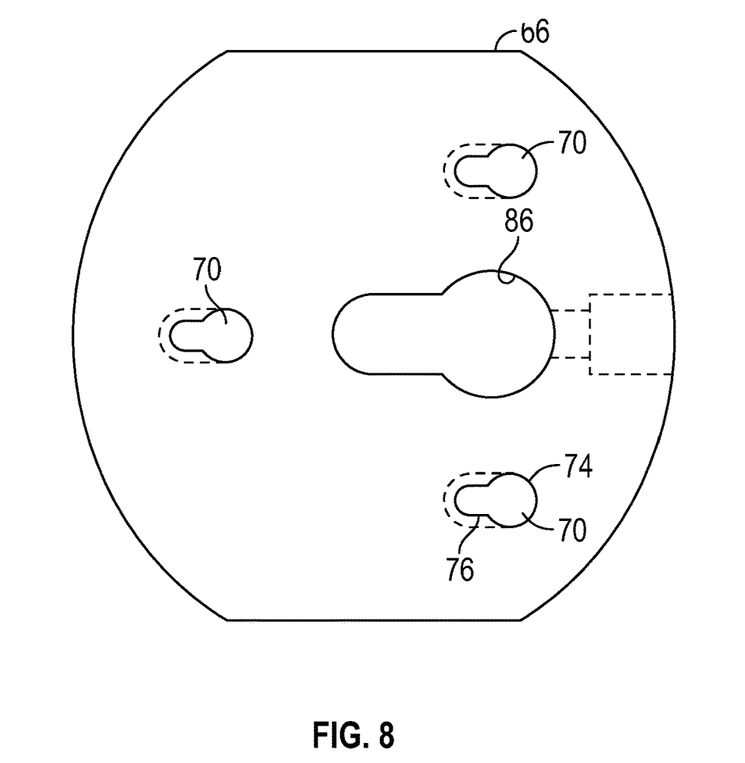
FIG. 8 is a top view of the valve pin plate from the actuator assembly of FIG. 3.
Figure 9:
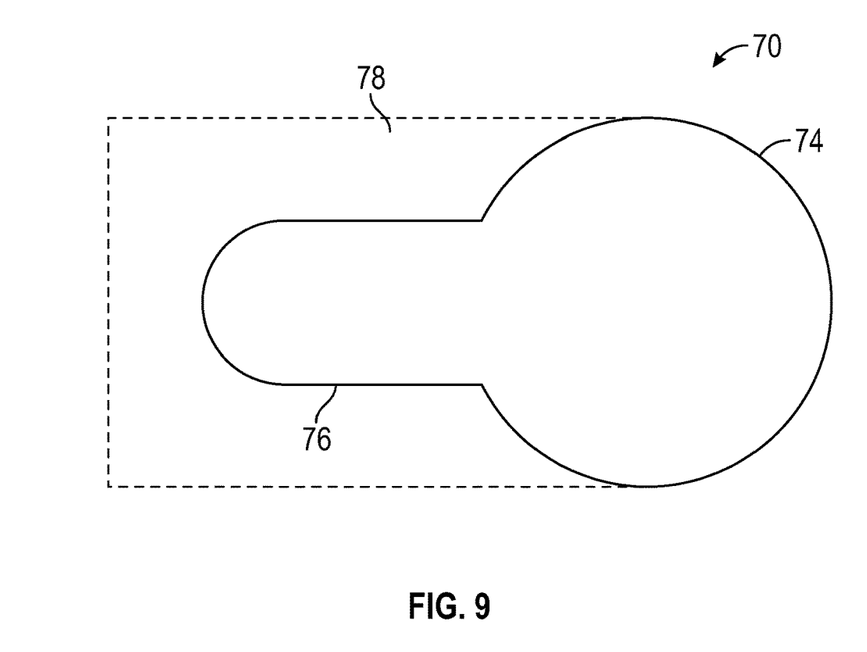
FIG. 9 is an enlarged top view of the pin retaining pocket defined in the valve pin plate of FIG. 8.

A valve pin plate 66 is connected to rod 64 and moves linearly with rod 64 as dictated by control of actuator 60. Valve pin plate 66 is provided with a plurality of pockets 70 (FIGS. 8 and 9) for releasably receiving and retaining valve pins 28. Pockets 70 are at least partially lipped, the lips of each pocket being Configured to engage an underside of a head 72 (FIG. 4) of valve pin 28. Each pocket 70 has a pin head receiving section 74 (FIGS. 8 and 9) that is configured to allow the head 72 to be inserted into the pocket, and a pin head retention section 76 that is narrower than the pin head and has ledges or lips 78 that are spaced apart to define a gap that is smaller than a diameter of the valve pin head 72 and at least equal to, or slightly larger than a diameter of the stem portion 80 of valve pin 28, such that when the pin head 72 is located in the pin head retention section 76 of pocket 70, valve pin 28 is held in pocket 70 and restricted from moving except linearly with valve pin plate 66. The pin head insertion section 76 is configured (shaped and sized) such that when pin head 72 is located in the pin head retention section, valve pin plate 66 can be removed (lifted away) from the valve pins 28.

Figure 6:
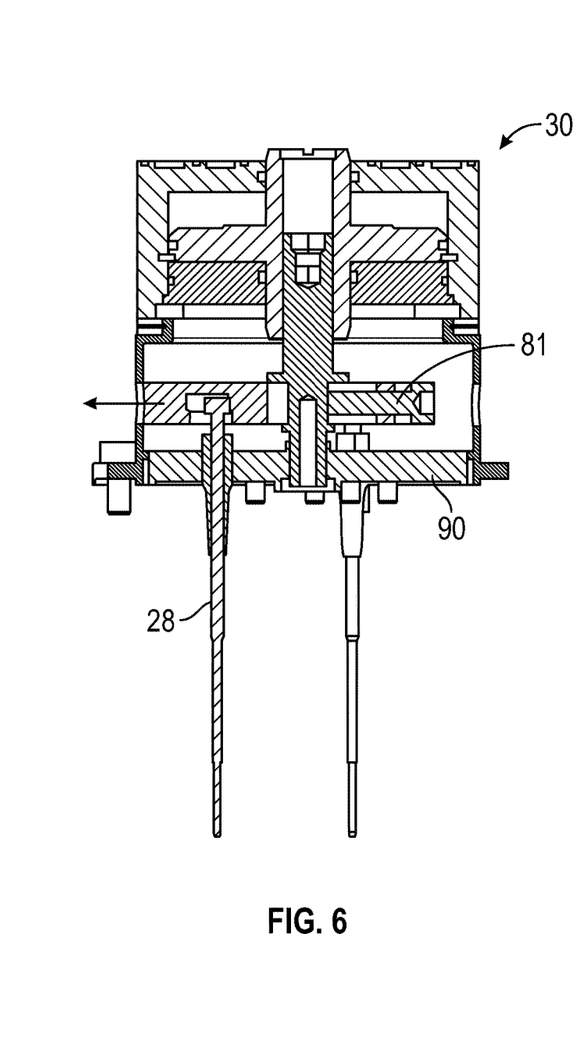
Figure 7:
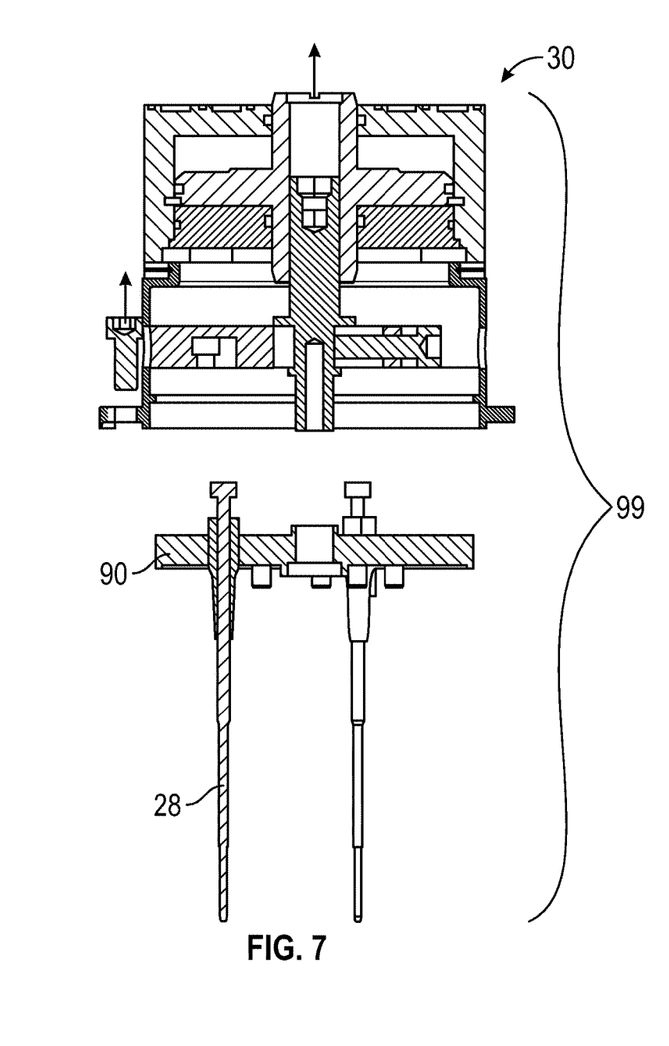

FIG. 6 shows actuator 30 moved linearly with respect to the valve pins 28 to a position in which the pin heads 72 can pass through the pin head receiving sections 72, to allow separation into components 99 as shown in FIG. 7.

Figure 10:
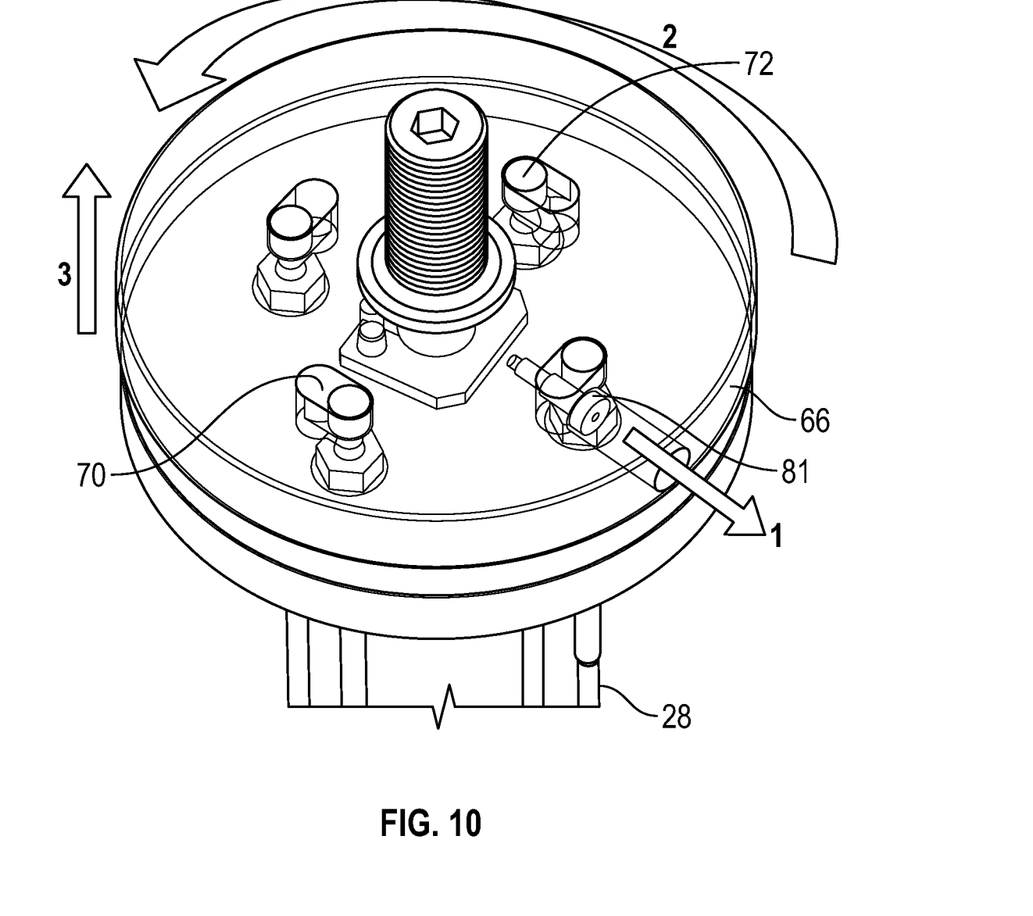
FIG. 10 is a perspective view of an alternative embodiment in which the actuator can be disengaged from a plurality of valve pins by a rotational movement.

Regardless of the number of pockets 70 for pins 28, the pockets are oriented so that plate 66 can be either moved linearly or rotated (as shown in FIG. 10) to simultaneously position all pins 28 in the pin head retention sections 76 to facilitate simultaneous control of flow through each associated nozzle 20, or moved in the opposite direction to simultaneously position all pins 28 in the pin head insertion section 74 to facilitate separation of the actuator assembly 30 from the pins 28. To allow separation of the actuator assembly from the pins using a linear motion, the straight portions of the pockets are arranged in parallel. To allow separation using a rotational motion, the lipped narrow part of the pockets can be arranged along a circular path in the plane of the valve plate. A lock 91 is used for holding the position of plate 66 relative to pins 28 such that pins 28 are held in the pin head retention section 76. Illustrated lock 91 is a socket head screw received in a threaded bore extending from a lateral edge of plate 66' to a surface of rod 64'. An opening 82 can be provided in a wall of actuator assembly housing 84 to provide access to the head of the set screw. Other mechanical locks (such as a spring loaded pin or latch mechanism) may be used as an alternative to a set screw.

In certain alternative embodiments, pockets 70 can be replaced with slots having a shape similar to pocket 70 (FIG. 9), including a pin receiving section through which pin head 72 can pass and a narrower pin retention section that prevents pin head 72 from passing therethrough, with the underside of pin head 72 engaging an upper surface of plate 66.

In certain embodiments, plate 66 can be provided with an aperture 86 (FIG. 8) that facilitates removal of plate 66 from rod 64 when lock 81 is disengaged (e.g., unsecured) from rod 64. Aperture 86 includes a larger diameter section through which a flanged nut can be passed and a narrow section through which the flange on the nut cannot be passed.

Figure 5:
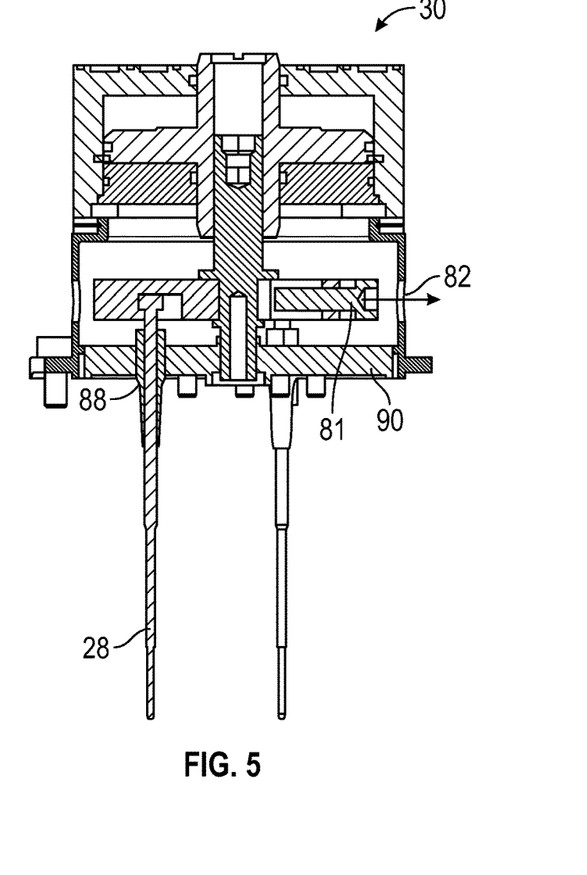

FIGS. 4-7 illustrates removal of actuator assembly 30 from pins 28. In the fully assembled state (FIGS. 1 and 4), pins 28 are guided by pin seals 88 held in pin seal retaining disc 90 secured to manifold 12, with pin heads 72 retained in the lipped portions of pockets 70. Simultaneous removal of actuator assembly 30 from all associated valve pins 28 is achieved by releasing lock 81 (e.g., unscrewing a screw) as shown in FIG. 5, moving the actuator assembly linearly (or rotatably) from an orientation wherein the pin heads 72 are positioned in the retentions section 76 to an orientation in which the pin heads 72 are positioned in the insertion/extraction section 74 of pockets 70 (as shown in FIG. 6), and separating the actuator assembly from the pins (as shown in FIG. 7). Installation is achieved by reversing the removal steps. The arrangement greatly simplifies decoupling of an actuator assembly from a plurality of valve pins. Another advantage is that because the valve pins remain with the manifold or hot runner assembly and are instead separated from the actuator assembly, the valve pins do not need to have their positions adjusted each time the system is serviced, thereby further reducing labor and production interruptions.

In the alternative embodiment shown in FIG. 10, which allows removal of pin heads 72 from pockets 70 by rotation (indicated by arrow 2) of valve pin plate 66', a U-shaped retaining clip 85 securable to plate 66' with bolt 87 secures plate 66' to piston rod 64'. A screw 91 extends radially through the valve pin plate into the narrower portions of the pockets to block rotation of plate 66' relative to the pins and pin seal retaining disc 90 during normal operation of hot runner assembly 10. The actuator assembly is removed, while leaving pins 28 in the manifold, by first removing or loosening screw 91 (indicated by arrow 1 in FIG. 10), then rotating the actuator assembly in the direction indicated by arrow 2 in FIG. 10, and finally lifting the actuator as indicated by arrow 3 in FIG. 10.

As shown in FIG. 5, a screw 81 extends through a threaded bore from a side of plate 66 to piston rod 64. When the radially inward end of screw 81 is engaged with rod 64, pin heads 72 of pins 28 are locked in place within the pin head retention sections 76 of pockets 70 for normal operation of hot runner assembly 10. For servicing the actuators, screw 81 is rotated (e.g., counter-clockwise) to draw the inwardly facing end of screw 81 away from rod 64. A screw access opening 82 through housing 65 can be configured so that when the head of screw 81 engages the inner surface of housing 65 adjacent opening 82, further rotation causes disc 66 to move away from the head of screw 81 causing the pin heads to move toward the pin head insertion (and removal) sections 74 of pockets 70 to allow removal of the actuator assembly.

FIGS. 11A-11D shows an alternative valve plate for facilitating removal of an actuator assembly 30 without removing valve pins 28. The valve pin plate 166 includes a plurality of valve plate segments 166A, 166B, 166C, which are bolted together, such as with bolts 97, wherein the segments have interfacing surfaces that together define a pin head retention pocket 170. In the illustrated segmented valve pin plate, three segments define three interfaces, with each interface configured to define a single pin head retention pocket. In general, it is preferred that each segment has two surfaces that interface with another segment to define a pin head retention pocket. For example, four segments could be used to define four pin head retention pockets at each of four interfaces. However, other arrangements are possible including a single interface defining two or more pockets, or an interface that does not define a pocket. Access openings 111 to bolts 97 are provided to allow loosening of the space between the segments to provide the needed clearance to remove the actuator assembly without removing pins 28.

Figure 11A:
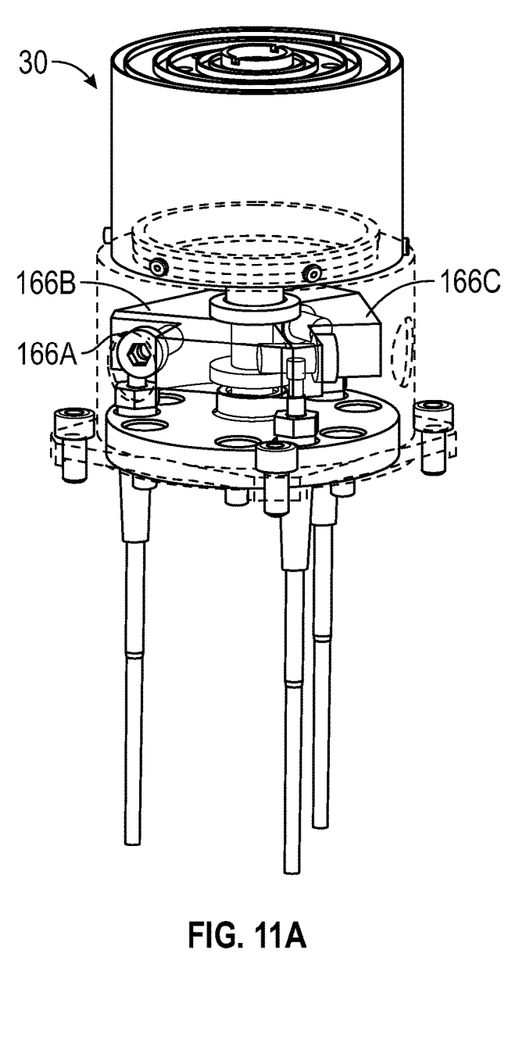
FIGS. 11A-11D are prospective views of an alternative valve plate configuration for facilitating removal of actuator assemblies from a hot runner system without removing valve pins from the manifold.
Figure 11B:
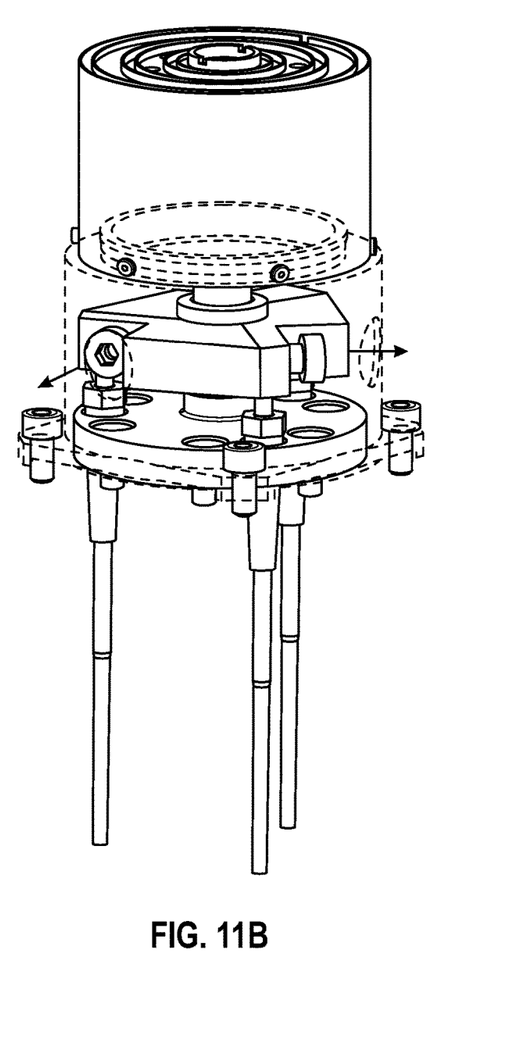
Figure 11C:
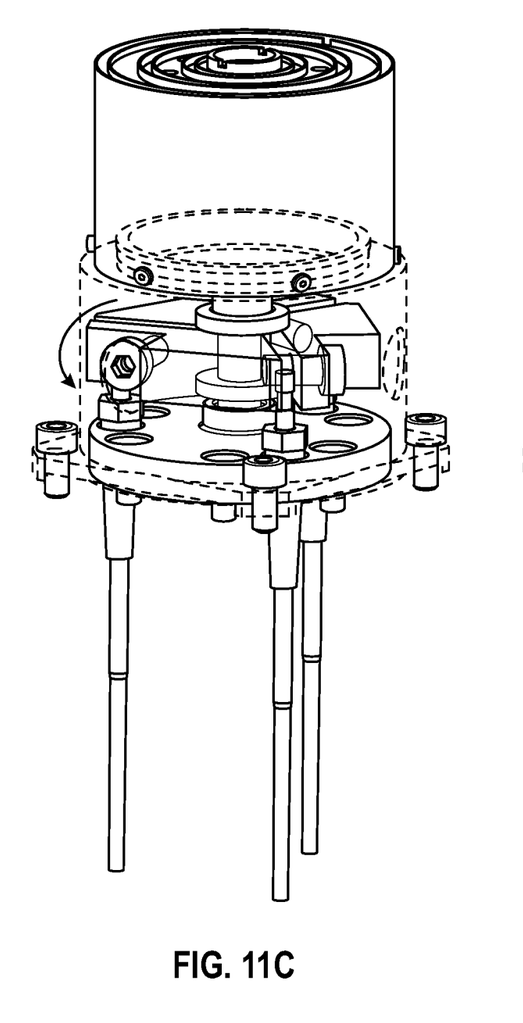
Figure 11D:
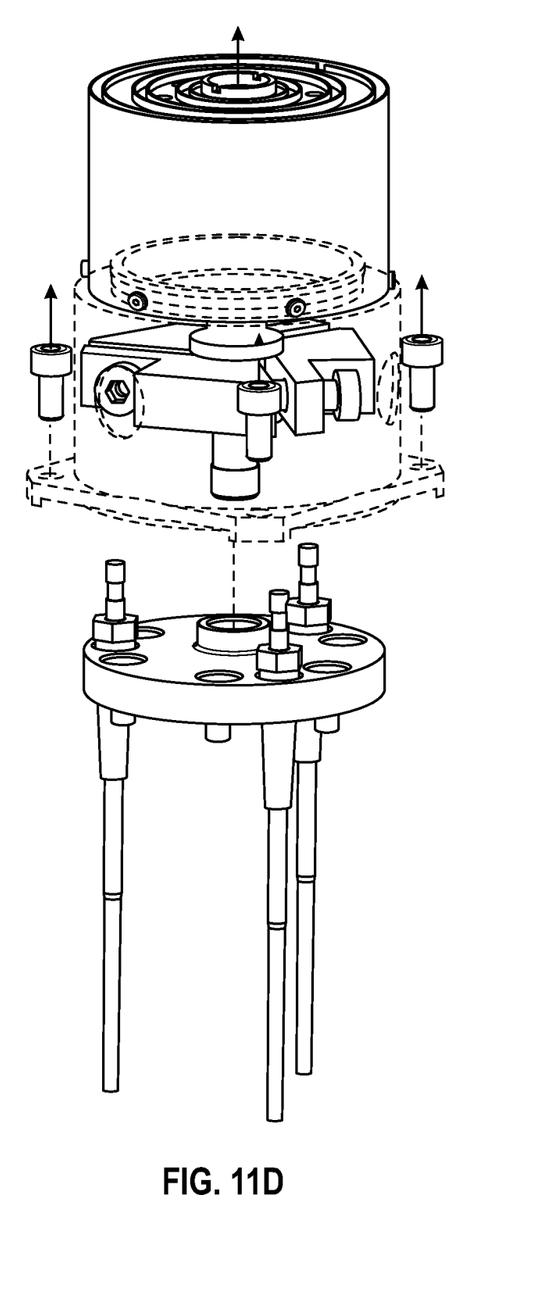

FIG. 11A shows the actuator assembly 30 and segmented valve pin plate 166 in the fully assembled state for normal operation. Removal of the actuator for servicing is achieved by first loosening bolts 97 as indicated by arrows in FIG. 11B. Next, the actuator assembly 30 is rotated slightly causing the interfacing surfaces of the segments to separate as shown in FIG. 11C, allowing the actuator assembly 30 to be lifted from the manifold and valve pins 28.

In certain embodiments, piston rod 89 can be provided with a bore at its lower end adjacent the manifold to reduce conductive heat transfer from the manifold to the actuator via rod 89.

Because pins 28 remain with the manifold during removal of actuator assemblies 30 in accordance with this disclosure, pin positioning does not need to be adjusted to properly align the tip of the pins with the nozzle gate each time the actuators are removed for servicing, further reducing labor and periods of non-production. The upper end of piston rod 64 is provided with a hexagonal recess 93 (or other driver engagement feature) to facilitate pin position adjustment with a driver tool.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

What is claimed is:

1. A valve gate assembly for an injection molding apparatus, comprising: a manifold having a plurality of passageways for conveying liquid resin from an injection molding machine to a mold cavity; a plurality of nozzles attached to the manifold, each nozzle having a longitudinal axis and a cylindrical bore extending along the longitudinal axis for conveying liquid resin from the manifold to the mold cavity; a plurality of valve pins, each valve pin associated with a corresponding one of the nozzles and being configured for linear movement within and along the cylindrical bore to control flow of liquid resin into the mold cavity, each valve pin having a head portion; an actuator having a linearly movable piston rod; a valve plate coupled to the rod and having a plurality of slots or pockets receiving and releasably holding a corresponding one of the plurality of valve pin heads; and a lock for engaging the rod and holding the valve pin heads in a fixed position in the slots or pockets; wherein the lock is received through an edge of the valve plate.

2. The assembly of claim 1, wherein the valve plate has pockets including a portion sized to allow insertion of the valve pin head and a narrower portion for retaining the valve pin head.

3. The assembly of claim 2, in which the plurality of pockets are arranged with the narrowed portions parallel such that the valve plate can receive a plurality of valve pin heads and be moved linearly to concurrently position all of the pin heads at the narrower portions of the pockets.

4. The assembly of claim 1, wherein the valve pin plate is disposed within a valve pin plate housing that is releasably coupled to an actuator housing containing a reciprocatable piston coupled to the linearly movable piston rod.

5. The assembly of claim 4, wherein the valve pin plate housing has a circumferential ledge that extends radially inwardly from an upper edge of a wall generally defining the valve pin plate housing, and a vertical circumferential wall extending upwardly from a radially inward edge of the circumferential ledge, such that the actuator housing is releasably supported on the valve pin plate housing with a lower edge of the actuator housing supported on the circumferential ledge and a lower end of a radially inwardly facing surface of the actuator housing abutting a radially outwardly facing surface of the vertical circumferential wall.

6. The assembly of claim 5, wherein the radially outwardly facing surface of the vertical circumferential wall has a circumferential groove, and the actuator housing is releasably secured to the valve pin plate housing by screws that engage the circumferential groove.

7. The assembly of claim 2, in which the plurality of pockets are arranged such that the actuator and valve pin plate can receive a plurality of valve pin heads and be rotated to concurrently position all of the pin heads at the narrower portions of the pockets.

8. The assembly of claim 7, wherein a U-shaped retaining clip extends around the piston rod and is bolted to the valve pin plate to secure the valve pin plate to the piston rod.

9. The assembly of claim 7, wherein a screw extends radially through the valve pin plate into the narrower portions of the pockets to block rotation of the valve pin plate relative to the valve pins.

10. The assembly of claim 1, wherein the valve plate has an aperture that facilitates removal of the valve plate from the rod when the lock is disengaged from the piston rod.

* * * * *